(12) United States Patent
Allison

(10) Patent No.: US 9,936,067 B1
(45) Date of Patent: Apr. 3, 2018

(54) SELECTING AUDIO PROFILES

(71) Applicant: Sorenson IP Holdings, LLC, Salt Lake City, UT (US)

(72) Inventor: Josh Allison, West Jordan, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 15/415,066

(22) Filed: Jan. 25, 2017

(51) Int. Cl.
| | |
|---|---|
| *H04M 11/00* | (2006.01) |
| *H04M 3/42* | (2006.01) |
| *H04M 1/725* | (2006.01) |
| *H04M 1/247* | (2006.01) |
| *H04M 3/00* | (2006.01) |
| *H04M 7/00* | (2006.01) |

(52) U.S. Cl.
CPC ..... *H04M 3/42068* (2013.01); *H04M 1/2475* (2013.01); *H04M 1/72591* (2013.01); *H04M 3/002* (2013.01); *H04M 3/42391* (2013.01); *H04M 7/0024* (2013.01); *H04M 2201/41* (2013.01); *H04M 2250/60* (2013.01)

(58) Field of Classification Search
CPC ........... H04M 1/2475; H04M 1/72591; H04M 3/42391; H04M 1/271; H04M 3/56; H04M 2201/40; H04M 203/5018
USPC ......... 379/52, 88.01, 93.05, 93.07; 370/352; 704/270, 246
See application file for complete search history.

(56) References Cited

U.S. PATENT DOCUMENTS

| | | | |
|---|---|---|---|
| 7,042,986 B1 * | 5/2006 | Lashley | .............. H04M 1/6025 379/390.01 |
| 2002/0183648 A1 | 12/2002 | Hou | |
| 2005/0260978 A1 | 11/2005 | Radar et al. | |
| 2006/0212479 A1 | 9/2006 | Habas et al. | |
| 2007/0225984 A1 * | 9/2007 | Milstein | .................. G10L 21/02 704/270 |
| 2008/0165980 A1 | 7/2008 | Pavlovic et al. | |
| 2010/0119093 A1 | 5/2010 | Uzuanis et al. | |
| 2010/0281113 A1 | 11/2010 | Laine et al. | |
| 2011/0176697 A1 | 7/2011 | Apfel et al. | |
| 2011/0200217 A1 | 8/2011 | Gurin | |

(Continued)

OTHER PUBLICATIONS

Amplicom PowerTel 7 Series Amplified Corded Telephone w/ Integrated Answering Machine, website: http://www.diycontrols.com/p-8499-amplicom-powertel-7-series-amplified-corded-telephone-w-integrated-answering-machine.aspx, retrieved on Sep. 19, 2016, 5 pages.

(Continued)

*Primary Examiner* — Melur Ramakrishnaiah

(74) *Attorney, Agent, or Firm* — Maschoff Brennan

(57) ABSTRACT

A computer-implemented method to select a user profile is disclosed. The method may include obtaining, from a first device, a communication attempt at a user device. The method may further include obtaining first device data associated with the communication attempt and with the first device. The method may also include comparing the first device data with multiple data elements of each of multiple user profiles associated with the user device. The method may further include selecting a user profile of the multiple user profiles that includes the data element that matches the first device data in response to the first device data matching a data element of the multiple data elements. The method may also include loading an audio profile for the selected user profile on the user device.

20 Claims, 9 Drawing Sheets

(56) References Cited

U.S. PATENT DOCUMENTS

| | | |
|---|---|---|
| 2011/0237295 A1 | 9/2011 | Bartkowiak et al. |
| 2013/0156209 A1* | 6/2013 | Visser .................. H04M 1/035 381/66 |
| 2014/0273962 A1* | 9/2014 | Sankaranarayanan ..................... H04W 12/06 455/411 |
| 2014/0379343 A1* | 12/2014 | Karimi-Cherkandi .. G10L 21/02 704/246 |
| 2015/0078371 A1* | 3/2015 | Efrati ................. H04L 65/1069 370/352 |
| 2015/0194154 A1 | 7/2015 | Lee et al. |
| 2016/0234606 A1 | 8/2016 | Selig et al. |

OTHER PUBLICATIONS

Amplicom PowerTel 785 Responder Amplified Telephone Combo, website: https://assistech.com/store/amplified-telephones/pt785, retrieved on Sep. 19, 2016, 3 pages.

* cited by examiner

SELECTING AUDIO PROFILES

FIELD

The embodiments discussed herein are related to selecting audio profiles.

BACKGROUND

Modern telecommunication services provide features to assist those who are deaf or hearing-impaired. One such feature is a text captioned telephone system for the hearing impaired. A text captioned telephone system may be a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to select a user profile on a user device is disclosed. The method may include obtaining, from a first device, a communication attempt at a user device. The method may further include obtaining first device data associated with the communication attempt and with the first device. The method may also include comparing the first device data with multiple data elements of each of multiple user profiles associated with the user device. The method may further include selecting a user profile of the multiple user profiles that includes the data element that matches the first device data in response to the first device data matching a data element of the multiple data elements. The method may also include loading an audio profile for the selected user profile on the user device.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
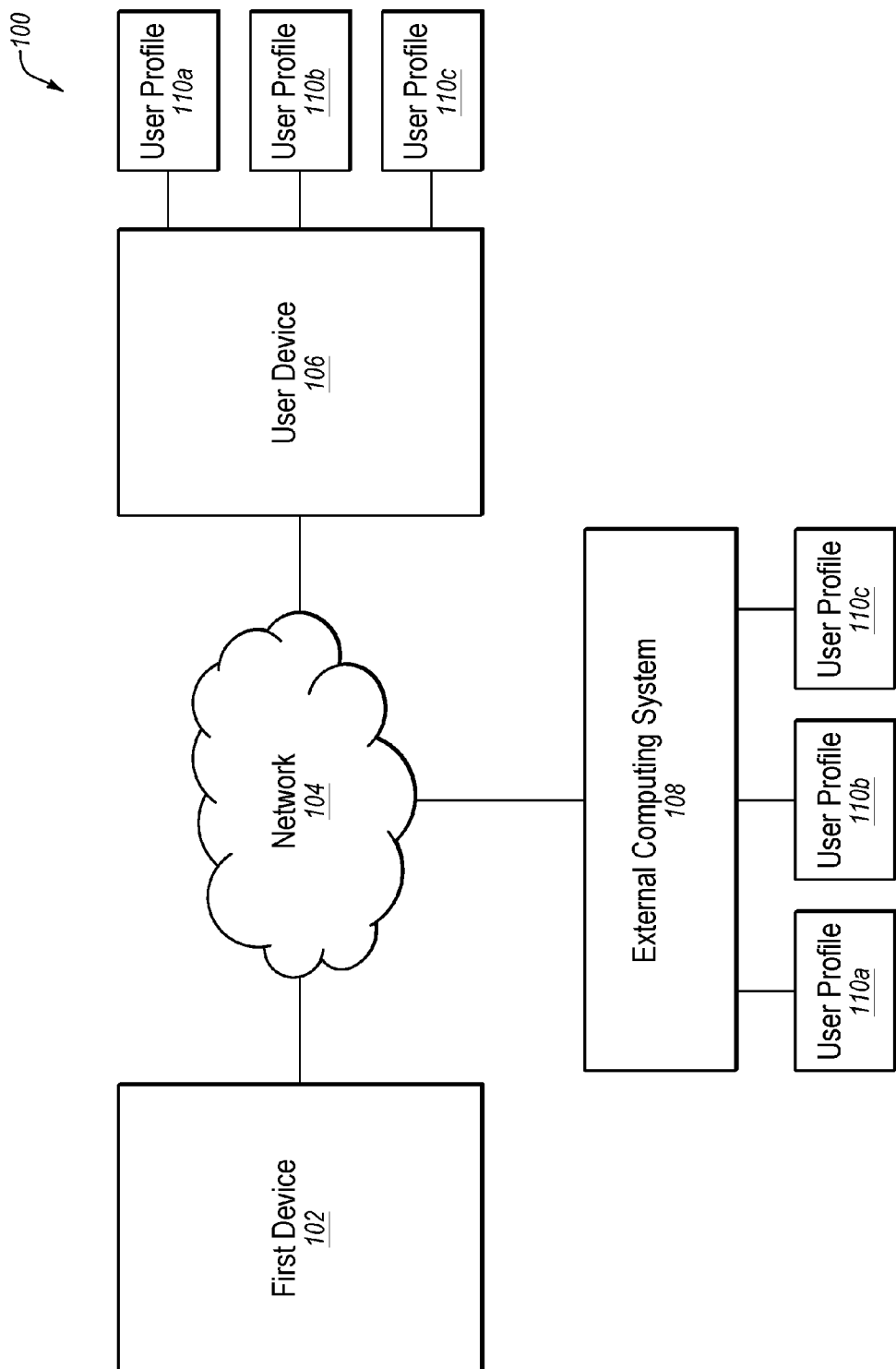
FIG. 1 illustrates an example environment related to selecting user profiles.

Some embodiments in this disclosure relate to a method and/or system that may select user profiles for a device. For example, a device, such as a communication device, may be used by multiple people. In some embodiments, the device may include a user profile for each of the multiple people that use the device. The user profile may be configured to include particular settings in the device for each of the multiple people.

The method and/or system as described in this disclosure may be configured to select a particular profile from among multiple profiles based on one or more factors. As a result, the device may be configured to automatically load a profile based on the one or more factors such that the device is ready for use by a user of the device associated with the loaded profile without the user of the device having to interact with the device in a manner to select an appropriate profile.

For example, in some embodiments, a user device may obtain a communication attempt from a first device. For example, a call may be placed from the first device to the user device. The user device may also obtain first device data associated with the communication attempt and with the first device. For example, the first device data may include caller-ID information, such as a name of a person associated with the first device and a phone number associated with the first device. The user device may compare the first device data with data from the user profiles on the user device. For example, in some embodiments, each user profile on the user device may have a contact list. In these and other embodiments, the user device may compare the caller-ID information of the first device data with each contact in each contact list of the user profiles of the user device.

If the caller-ID information matches a contact in a contact list of one of the user profiles, the user profile may be selected. If the caller-ID information does not match any contact in the contact lists of any of the user profiles associated with the user device, the user device may compare the first device data with the entries of the communication history of each of the user profiles associated with the user device. In some embodiments, each entry in the communication history may include a source identification number, a number of communication requests obtained from the source identification number, and/or the duration of communication sessions between the user device and the first device. In these and other embodiments, the communication history may have an entry that matches the caller-ID information. For example, the entry may indicate that ten communication requests have been received from the identification number associated with the caller-ID information. If the caller-ID information matches an entry in a communication history of one of the user profiles, the user profile may be selected. If the caller-ID information does not match any entry in the communication histories of any of the user profiles associated with the user device, the user device may select a default user profile.

The user device may load the selected user profile onto the user device. In some embodiments, loading the user profile onto the user device may include loading an audio profile for the user profile. The audio profile may include an audiogram of the hearing ability of the user associated with the user device. The user profile may also include other settings for the user device such as a volume setting, a UI configuration, a calendar, and/or other settings. The user profile may also include a voice profile associated with the user.

In some embodiments, a communication session may be established with the first device and the user device. For example, in some embodiments, an audio communication such as a phone call or a video communication such as a video call may be established between the first device and the user device. During the communication session, the user speaking on the user device may change. For example, the user associated with the user device may stop speaking on the user device and a current user may begin speaking on the user device. The current user may have a different voice profile than the voice profile of the user associated with the user profile. A difference between the voice profile of the current user speaking on the user device and the voice profile of the selected user profile may be recognized. If there is no difference in the voice profile of the current user and the voice profile of the selected user profile, the audio profile of the selected user profile may be retained on the user device. In response to recognizing a difference between the voice profiles, a different user profile may be selected. An audio profile associated with the different user profile may be loaded on the user device. The selected user profile may assist the user to understand the audio from the communication and may enhance the user's use of the user device.

In some embodiments, the systems and/or methods described in this disclosure may help to enable the selection of a user profile on a user device or other devices. Thus, the systems and/or methods provide at least a technical solution to a technical problem associated with the design of user devices in the technology of telecommunications.

Turning to the figures, FIG. 1 illustrates an example environment 100 related to selecting user profiles. The environment 100 may be arranged in accordance with at least one embodiment described in the present disclosure. The environment 100 may include a first device 102, a network 104, a user device 106, and an external computing system 108.

The first device 102 may be any electronic or digital device. For example, the first device 102 may be a smartphone, a mobile phone, a tablet computer, a laptop computer, a desktop computer, a phone console, or other processing device.

The first device 102 may be configured to send a communication attempt to the user device 106. The communication attempt may include part of a request for a communication session with the user device 106 or may include part of a communication session with the user device 106. For example, the communication attempt may include a request to establish or be part of a video communication session that includes video and audio streams. Alternatively or additionally, the communication attempt may include a request to establish or be part of an audio communication session that includes audio streams. Alternatively or additionally, the communication attempt may include a Multimedia Messaging Service (MMS) message, a Short Message Service (SMS) message, an email message, or another messaging type. In some embodiments, the communication attempt may include an attached media file. For example, the communication attempt may be an MMS that includes an attached video file or an attached audio file.

In some embodiments, the communication attempt may be altered to include first device data or may be accompanied with first device data. In some embodiments, the first device data may include information associated with the first device 102 and/or information associated with the communication attempt. In some embodiments, the first device data may include information associated with a user of the first device 102. In some embodiments, the first device data may include data that may correspond to or match contacts in a contact list of a user profile 110 or entries in a communication history of a user profile 110. In some embodiments, the first device data may include data that may correspond to or match other data elements of a user profile 110 associated with the user device 106. In some embodiments, the first device data may include an identification number, an identification username, or a communication time, among other data elements.

For example, a network provider for the first device 102 may include an identification number for the first device 102 with the communication attempt. For example, if the first device 102 is a traditional analog telephone and the communication attempt is a telephone call to the user device 106, the telephone service provider for the first device 102 may include the telephone number of the first device 102 with the communication attempt as the first device data. In these and other embodiments, the user device 106 may be a telephone. The telephone service provider for the user device 106 may also use the telephone number provided with the communication attempt to query a caller name delivery (CNAM) database provider to determine a name associated with the telephone number. In these and other embodiments, the telephone service provider may provide the name in the first device data along with the telephone number. In some embodiments, the first device 102 may transmit a name as the first data along with the communication attempt using Primary Rate Interface (PRI) technology. However, if the user device 106 does not use PRI technology, the telecommunications provider of the user device 106 may query a CNAM database to provide a caller name as discussed previously.

In some embodiments, the first device 102 may be a Voice over Internet Protocol (VoIP) device or may be configurable to establish VoIP communication sessions. In these and other embodiments, the user of the first device 102 may be able to select his or her own identifying number. The identifying number may be transmitted with the communication attempt by the VoIP service provider as the first device data in a manner analogous to the transmission of the identifying number over an analog telephone line as described above.

Alternatively or additionally, in some embodiments, the communication attempt may include first device data. For example, in some embodiments an email message may be the communication and the email message may include an originating email address. In these and other embodiments, the first device data may include an identification number, an identification user name, a communication time, a communication duration, among other data elements.

The user device 106 may be any electronic or digital device. For example, the user device 106 may be a smartphone, a mobile phone, a tablet computer, a laptop computer, a desktop computer, a phone console, or other processing device. The user device 106 may be configured to enable a user to participate in a communication session or interact with the communication attempt. For example, in some embodiments the user device 106 may include a speaker and a microphone. When the communication attempt is part of a communication session, the speaker and the microphone may allow a user of the user device 106 to communicate with the sender of the communication attempt. In some embodiments, the user device 106 may further include a video screen. In these and other embodiments, the video screen may be configured to present a transcript of the communication session. In some embodiments, the video screen may be configured to present the communication session, such as when the communication session is a video communication. In some embodiments, the user device 106 may include computer-readable instructions that are configured to be executed by the user device 106 to perform operations described in this disclosure.

In some embodiments, the user device 106 may be configured to present the communication attempt for viewing and/or listening on the user device 106 and to present a transcript of the audio of the communication for viewing on the user device 106. For example, when the communication attempt is an MMS message, the user device 106 may present the MMS on the display of the user device 106. If a communication session is established by the user device 106 with the first device 102 and the communication session is a video communication, the user device 106 may be configured to present the video of the video communication. The user device 106 may be configured to present the transcript during the communication session or during playback of a media file of the communication attempt, such as when the communication attempt is an MMS message.

The communication attempt may be provided to the user device 106 over a network 104. In some embodiments, the network 104 may include any network or configuration of networks configured to send and receive communications between devices. In some embodiments, the network 104 may include a conventional type network, an optical network, a wired or wireless network, and may have numerous different configurations. Furthermore, the network 104 may include a local area network (LAN), a wide area network (WAN) (e.g., the Internet), or other interconnected data paths across which multiple devices and/or entities may communicate.

In some embodiments, the network 104 may also be coupled to or may include portions of a telecommunications network, including analog telephone lines, for sending data in a variety of different communication protocols, such as a plain old telephone system (POTS). The network 104 may include one or more analog networks for connecting a traditional analog home telephone service to the user device 106. In some embodiments, the network 104 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 104 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

In some embodiments, the network 104 over which the communication attempt is provided to the user device 106 may or may not be the same as the network 104 over which the user device 106 is coupled to the external computing system 108.

In some embodiments, the user device 106 may include multiple user profiles 110a-110c. Although illustrated as three user profiles 110a-110c, the user device 106 may include any number of user profiles 110. Each user profile 110 may include multiple data elements. For example, the data elements may include a contact list of contacts associated with the user profile 110. In some embodiments, each contact may include a name and a telephone number of the contact. In some embodiments, each contact may also include an identification number, an identification username, an email address, among other data about a contact.

Alternatively or additionally, the data elements may include a communication history associated with the user profile 110. For example, the communication history may include a list of incoming communication attempts directed to the user device 106 during which the user profile 110 was loaded onto the user device 106. Alternatively or additionally, in some embodiments, the communication history may include a list of communication sessions during which the user profile 110 was loaded onto the user device 106. For example, the list of incoming communication attempts may include an identification number associated with the first device 102 from which the communication attempt was obtained, an identification username associated with the first device 102 from which the communication attempt was obtained, a duration of each of the communication session, a time at which the communication attempt was obtained, and other data associated with each of the communication attempts and/or communication sessions. Alternatively or additionally, the communication history may include a list of outgoing communication attempts and/or communication sessions directed from the user device 106 during which the user profile 110 was loaded onto the user device 106. For example, the list of outgoing communication attempts may include an intended recipient of each of the communication attempts, a duration of each of the communication sessions, and other data associated with each of the communication attempts and/or communication sessions.

In some embodiments, the data elements may include other information associated with the user. In some embodiments, the data elements may include the name of the user or the address of the user. In some embodiments, the user profile 110 may have information related to a medical history of the user. In these and other embodiments, the data elements may include information related to the currently prescribed medications of the user, the primary care physician treating the user, and/or additional information relating to the medical diagnoses and treatment of the user. Additionally or alternatively, the data elements may include information relating to the allergies of the user. In some embodiments, the medical history of the user may include information regarding scheduled appointments of the user with primary care providers or specialist providers.

The user profile 110 may also include settings for the user device 106. The user device 106 may be used by a user that is hearing-impaired. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others. In some embodiments, one or more of the people that use the user device 106 may be hearing-impaired.

In these and other embodiments, one or more of the settings of the user device 106 may be an audio setting that relates to a frequency response of audio output by the user device 106. For example, the user device 106 may be able to configure different amplification settings for different frequencies or frequency ranges based on a hearing-requirements of a user. In these and other embodiments, the audio setting may be unique for each user based on a user's particular hearing loss. Other settings may include contacts, display settings, or communication histories, among other settings. For example, the user profile 110 may include a volume setting for the user device 106. Alternatively or additionally, the user profile 110 may include an audio profile for the user device 106. The audio profile of the user profile 110 associated with the user device 106 may include an audiogram related to a specific hearing impairment experienced by the user associated with the user profile 110. Thus, when the user profile 110 is loaded, the audio profile associated with the user profile is loaded and may adjust the frequency response of audio output by the user device 106 to assist a user to understand the audio and help to overcome the specific hearing impairment of the user. In some embodiments, the user profile 110 may also include a voice profile.

The voice profile may include data to identify speech to determine if it is being spoken by the user associated with the user profile 110.

In some embodiments, the external computing system 108 may be communicatively coupled to the user device 106 via the network 104. The external computing system 108 may be configured to include copies of the user profiles 110a-110c that may also be stored on the user device 106. In some embodiments, the user profiles 110a-110c included in the external computing system 108 may be identical or similar to corresponding user profiles 110a-110c included on the user device 106. In some embodiments, the external computing system 108 may be configured to copy the user profiles 110a-110c from the user device 106 periodically as a backup. In these and other embodiments, the user profiles 110a-c may be restored from the external computing system 108 to the user device 106 or to a different user device at a later time via the network 104. Alternatively or additionally, the user device 106 may be configured to copy the user profiles 110a-c from the external computing system 108 as a backup. In these and other embodiments, the user profiles 110a-c may be restored to the external computing system 108 from the user device 106 via the network 104.

In some embodiments, the external computing system 108 may include any configuration of hardware, such as one or more processors, servers, and databases that are networked together and configured to perform a task. For example, the external computing system 108 may include one or more multiple computing systems, such as multiple servers that each include memory and at least one processor, which are networked together and configured to perform operations as described in this disclosure, among other operations. In some embodiments, the external computing system 108 may include computer-readable-instructions that are configured to be executed by the external computing system 108 to perform operations described in this disclosure.

The user device 106 may be configured to obtain a communication attempt from the first device 102. In some embodiments, the communication attempt may be a communication request such as an audio communication request or a video communication request. In some embodiments, the communication attempt may be a message such as an MMS with an attached media file. The user device 106 may obtain first device data associated with a communication attempt. In some embodiments, the user device 106 may compare the first device data with data elements of multiple user profiles 110 associated with the user device 106. Based on the comparison between the first device data and the data elements of the multiple user profiles 110, the user profile 110 that includes the data elements that correspond to or match the first device data may be loaded onto the user device 106. Loading the user profile 110 may include loading an audio profile of the user profile 110 associated with the hearing impairment of a user. Loading the user profile 110 may also include loading device settings for the user device 106. In some embodiments, the user device 106 may be configured to establish a communication session with the first device. During the communication session, the user device 106 may be configured to recognize a difference in the voice profile of a current user speaking on the user device 106 and the voice profile of the user profile 110 loaded onto the user device 106. In response to recognizing the difference, a different user profile 110 may be selected and loaded onto the user device 106.

For example, in some embodiments, the user device 106 may be configured to obtain first device data associated with inbound telephone calls directed to the user device 106. In these and other embodiments, the first device data may include a telephone number associated with the first device 102. In these and other embodiments, the first device data may also include a name associated with the first device 102. In these and other embodiments, the first device data may also include a time when the inbound telephone call is obtained by the user device 106. As another example, in some embodiments, the user device 106 may be configured to obtain first device data associated with an inbound email message directed to the user device 106. In these and other embodiments, the first device data may include an email address associated with the first device 102 and a time when the email message is obtained by the user device 106.

The user device 106 may compare the first device data with multiple data elements of each user profile 110 associated with the user device 106. For example, the data elements may include a contact list. Each user profile 110 may include a contact list. Each contact list may include multiple contacts that are associated with the user profile 110. In some embodiments, contacts may be included in the contact list by being added by the user associated with the user profile 110. In some embodiments, contacts may be included in the contact list by being added by a third-party.

In some embodiments, the data elements may include a communication history. Each user profile 110 may include a communication history, which may include multiple entries. In these and other embodiments, each entry in the communication history may include an identification number, a communication attempt time, and/or other information related to communication attempts and/or communication sessions.

In some embodiments, a user profile 110 may be selected by matching the first device data with data elements of the user profile 110 related to the medical history of the user. For example, if the user has scheduled a surgical appointment at a local hospital and a phone call is placed from a number associated with the hospital to the user device 106, the user profile 110 of the user with the surgical appointment may be selected and loaded onto the user device 106. Alternatively or additionally, the first device data may be related to other information included in the user profile 110.

In some embodiments, the user device 106 may select a user profile 110 based on the comparison of the first device data with the multiple data elements of each user profile 110. In some embodiments, the user device 106 may compare first device data with the multiple data elements in a hierarchy. For example, in some embodiments, the user device 106 may compare the first device data with a first type of data element prior to comparing the first device data to other types of data elements. If the first device data matches a data element of the first type, the user profile 110 associated with the data element of the first type may be selected. If the first device data does not match any data elements of the first type, the user device 106 may compare the first device data with a second type of data element. If the first device data matches a data element of the second type, the user profile 110 associated with the data element of the second type may be selected. If the first device data does not match any data elements of the second type, the user device 106 may compare the first device data with a third type of data element. If the first device data matches a data element of the third type, the user profile 110 associated with the data element of the third type may be selected. If the first device data does not match any data elements of the third type, the user device 106 may select a default user profile 110 to load onto the user device 106. The hierarchy described includes three levels. However, the hierarchy may include more or less levels than the three described in various embodiments.

For example, in some embodiments, the user device 106 may compare the first device data with contacts in a contacts list of each of the user profiles 110 associated with the user device 106. When the first device data matches a contact in one of the contact lists, the user profile 110 that includes the contact list may be selected. When the first device data does not match any contacts in any of the contact lists, the user device 106 may compare the first device data with entries in communication histories of each of the user profiles 110 associated with the user device 106. When the first device data matches an entry in one of the communication histories, the user profile 110 that includes the communication history may be selected. When the first device data does not match any entries in any of the communication histories, the user device 106 may select a default user profile 110. The default user profile 110 may be a user profile 110 of a user of the user device 106 that is designated as the default user profile 110 or the default user profile 110 may be a standardized user profile 110 that is not associated with any particular user of the user device 106.

The selected user profile 110 may be loaded onto the user device 106. During a communication session, the user device 106 may determine that a different user is using the user device 106. In response to determining that a different user is using the user device 106, a different user profile 110 may be loaded onto the user device 106.

An example of the operation of the environment 100 follows. A communication attempt may be obtained from a first device 102 at a user device 106. The communication attempt may be sent via the network 104. The network 104 may include one or more cellular networks, the Internet, and other wireless or wired networks. For example, an audio communication attempt may be sent to the user device 106. Additionally or alternatively, an email with an attached video file may be sent from a laptop computer to the user device 106. Alternatively or additionally, an MMS message with an audio file may be sent from a smartphone to the user device 106.

The communication attempt may include audio data in the form of an attached media file that may include audio data. In some embodiments, the communication session may include audio data in the form of an individual's voice during an audio communication or a video communication. The audio data may originate from any other device. For example, the audio communication may be a live telephone call. Alternatively or additionally, a media file may be a video recorded on a computing device and attached to a message. In some embodiments, the communication attempt may include first device data. Alternatively or additionally, the user device 106 may obtain data from a telecommunications network provider or from a CNAM database provider. The first device data may include an identification number, an identification user name, an originating email address, a communication time, and/or a communication duration.

The user device 106 may compare the first data with data elements of each user profile 110 of the multiple user profiles 110 that are associated with the user device 106. In some embodiments, the multiple user profiles 110 that are associated with the user device 106 may be stored on the user device 106. Alternatively or additionally, the multiple user profiles 110 that are associated with the user device 106 may be stored on an external computing system 108. In some embodiments, the multiple user profiles 110 may be stored only on the user device 106. In some embodiments, the multiple user profiles 110 may be stored only on the external computing system 108. In some embodiments, the multiple user profiles 110 may be stored on both the user device 106 and on the external computing system 108. For example, in some embodiments, the user device 106 may compare the first device data with the contact list of each user profile 110 of the multiple user profiles 110 that are associated with the user device 106. In response to the first device data matching a contact in a user profile 110a, the user device 106 may load an audio profile of the user profile 110a.

Additionally or alternatively, the user device 106 may compare the first device data with an entry in a communication history of each user profile 110 of the multiple user profiles 110 that are associated with the user device 106. In response to the first device data matching an entry in a communication history of a user profile 110b, the user device 106 may load an audio profile of the user profile 110b. Additionally or alternatively, the user device 106 may compare the first device data with other data elements of each user profile 110 of the multiple user profiles 110 that are associated with the user device 106. In response to the first device data not matching any data elements of any user profiles 110 of the multiple user profiles 110 that are associated with the user device 106, the user device 106 may load an audio profile of a default user profile 110.

The user device 106 may establish a communication session with the first device. During the communication session, a second user may begin to use the user device 106. The second user may begin speaking on the user device. The presence of the second user may be detected by comparing a voice profile of the second user with a voice profile of the selected user profile 110. In response to detecting a difference between the voice profile of the second user and the voice profile of the selected user profile 110, the user device 106 may select a different user profile 110. In some embodiments, the user device 106 may select a different user profile 110 that includes a voice profile that matches the voice profile of the second user. In some embodiments, the user device 106 may select a default user profile 110 as the different user profile 110. The audio profile of the different user profile 110 may be loaded on the user device 106. In response to not detecting a difference between the voice profile of the second user and the voice profile of the user profile 110, the audio profile of the user profile 110 may be retained on the user device 106.

Modifications, additions, or omissions may be made to the environment 100 without departing from the scope of the present disclosure. For example, in some embodiments, the environment 100 may include additional devices similar to the user device 106. Alternatively or additionally, the communication attempt may be directed to multiple user devices 106. Alternatively or additionally, one or more of the communication couplings between the first device 102, the user device 106, and/or the external computing system 108 may be a wired connection. Alternatively or additionally, the environment 100 may include a transcription system to generate transcripts of the communication attempt or the communication session for presentation on the user device 106.

Alternatively or additionally, the environment 100 may not include an external computing system 108. In these and other embodiments, the multiple user profiles 110 may be stored on the user device 106 and may not be stored on an external computing system 108. Alternatively or additionally, in some embodiments, the multiple user profiles 110 may not be stored on the user device 106. In these and other embodiments, the external computing system 108 may be configured to perform operations described above to match first device data of the communication attempt with data elements of a user profile 110 associated with the user device 106. In these and other embodiments, the external computing system 108 may select a user profile 110 that matches the first device data of the communication attempt and may provide the user profile 110 to the user device 106 via the network 104.

Figure 2:
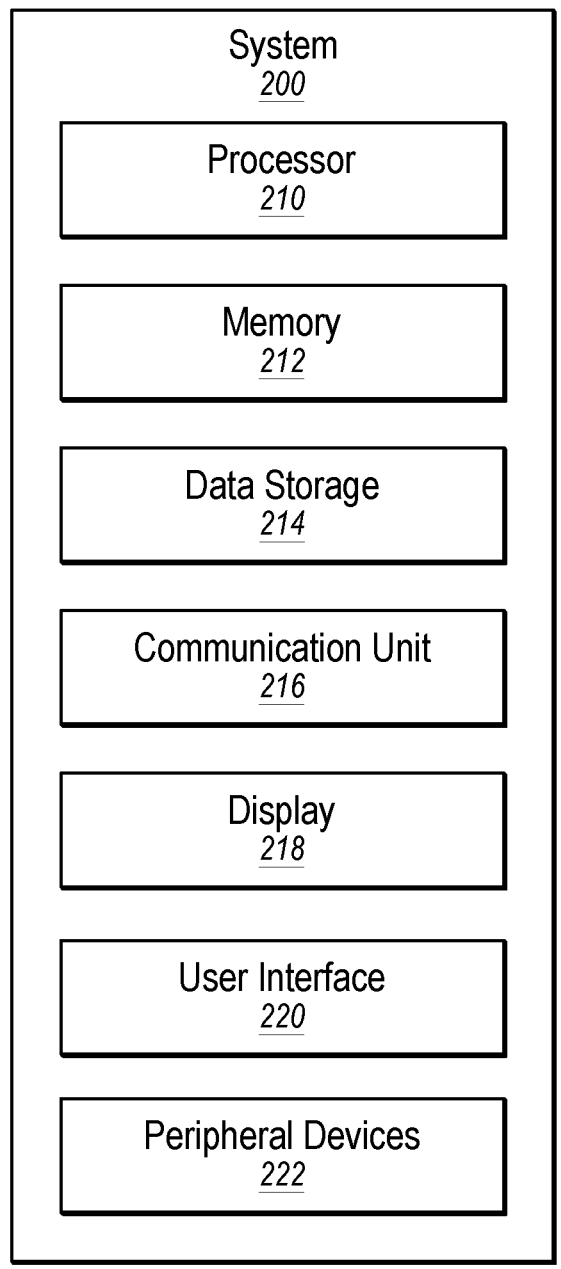
FIG. 2 illustrates an example system that may be used in selecting user profiles.

FIG. 2 illustrates an example computing system 200 that may be arranged in accordance with at least one embodiment described in the present disclosure. The system 200 may include a processor 210, a memory 212, a data storage 214, a communication unit 216, a display 218, a user interface 220, and peripheral devices 222, which all may be communicatively coupled. In some embodiments, the system 200 may be part of any of the electronic devices described in this disclosure. For example, the system 200 may be part of the user device 106 of FIG. 1, the first device 102 of FIG. 1, and/or the external computing system 108 of FIG. 1.

Generally, the processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 2, it is understood that the processor 210 may include any number of processors distributed across any number of networks or physical locations that are configured to perform individually or collectively any number of operations described herein. In some embodiments, the processor 210 may interpret and/or execute program instructions and/or process data stored in the memory 212, the data storage 214, or the memory 212 and the data storage 214. In some embodiments, the processor 210 may fetch program instructions from the data storage 214 and load the program instructions into the memory 212.

After the program instructions are loaded into the memory 212, the processor 210 may execute the program instructions. For example, the system 200 may be part of the user device 106 of FIG. 1. In these and other embodiments, the program instructions may cause the processor 210 to perform the operations of selecting a user profile in response to obtaining a communication attempt. As another example, the system 200 may be part of the external computing system 108 of FIG. 1. The program instructions may cause the processor 210 to perform the operations of generating a backup of the user profiles on the user device 106.

The memory 212 and the data storage 214 may include computer-readable storage media for carrying or having computer-executable instructions or data structures stored thereon. Such computer-readable storage media may be any available media that may be accessed by a general-purpose or special-purpose computer, such as the processor 210. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 210 to perform a certain operation or group of operations.

The communication unit 216 may include any component, device, system, or combination thereof that is configured to transmit or receive information over a network. In some embodiments, the communication unit 216 may communicate with other devices at other locations, the same location, or even other components within the same system. For example, the communication unit 216 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 216 may permit data to be exchanged with a network and/or any other devices or systems described in the present disclosure.

The display 218 may be configured as one or more displays, like an LCD, LED, or other type display. The display 218 may be configured to present video, text captions, user interfaces, and other data as directed by the processor 210. For example, the display 218 may present a video communication, a transcript, a multimedia message, among other information.

The user interface 220 may include any device that allows a user to interface with the system 200. For example, the user interface 220 may include a mouse, a track pad, a keyboard, a touchscreen, a telephone switch hook, and/or a telephone keypad, among other devices. The user interface 220 may receive input from a user and provide the input to the processor 210.

The peripheral devices 222 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 200 or otherwise generated by the system 200.

Modifications, additions, or omissions may be made to the system 200 without departing from the scope of the present disclosure.

Figure 3A:
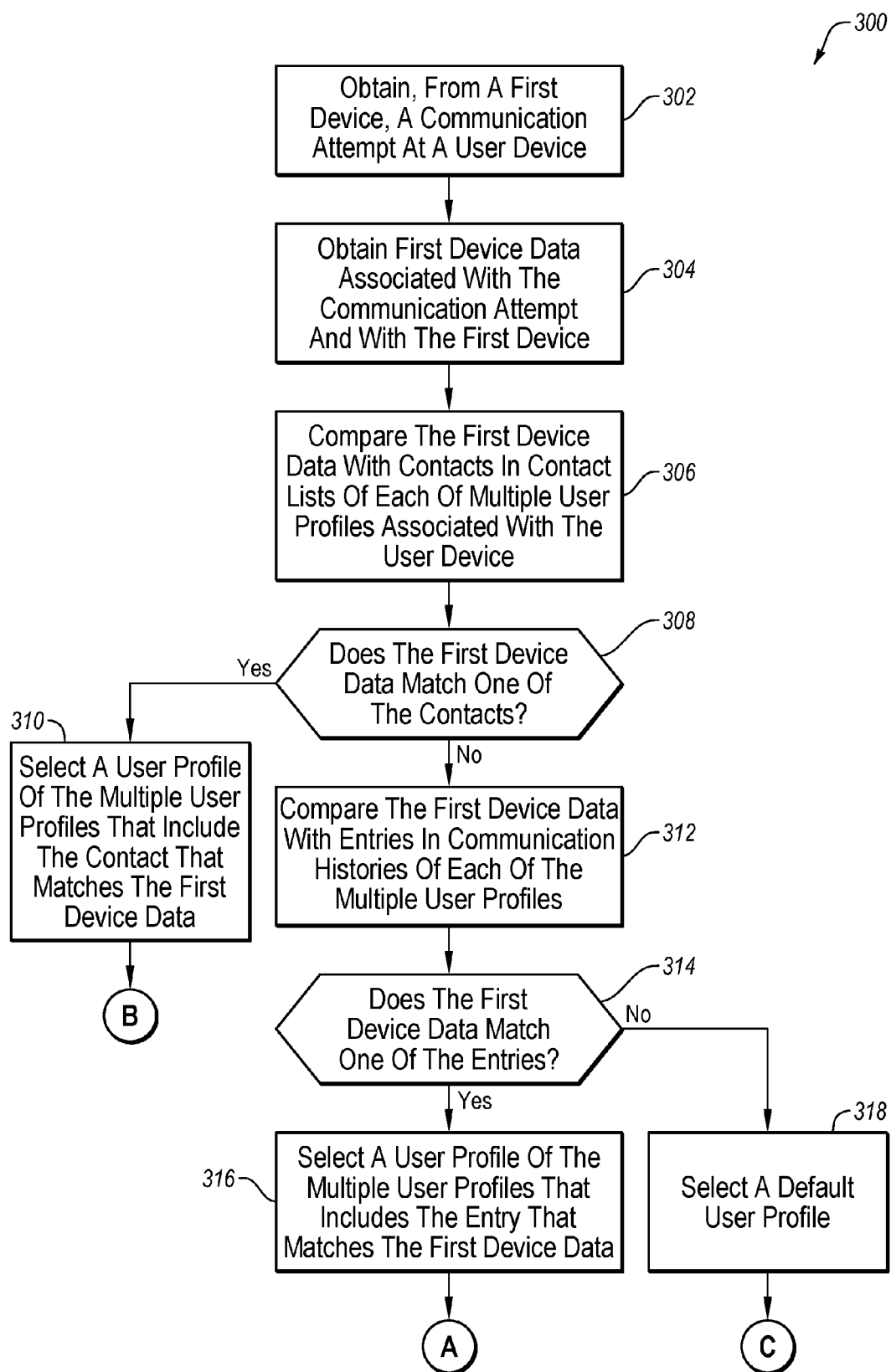
FIGS. 3a and 3b illustrate an example process related to selecting user profiles.
Figure 3B:
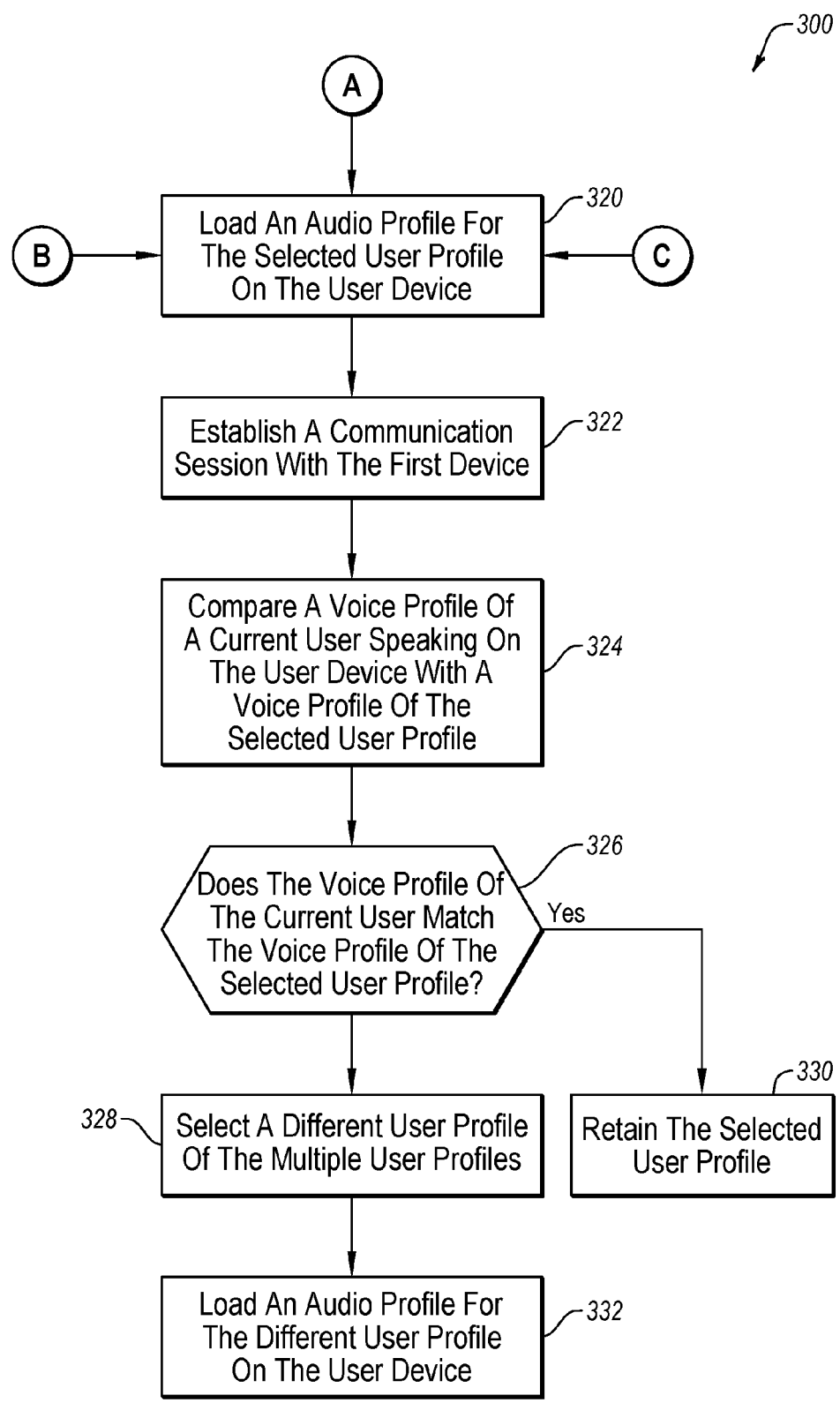

FIGS. 3a and 3b illustrate an example process related to selecting user profiles. The process 300 may be arranged in accordance with at least one embodiment described in the present disclosure. The process 300 may be performed, in whole or in part, in some embodiments by a system and/or environment, such as the environment 100, the system 200, and/or the communication system 700 of FIGS. 1, 2, and 7, respectively. In these and other embodiments, the process 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The process 300 may begin at block 302, where a communication attempt may be obtained from a first device at a user device.

In block 304, first device data associated with the communication attempt and with the first device may be obtained.

In block 306, the first device data may be compared with contacts in contact lists of each of multiple user profiles associated with the user device. In some embodiments, the user profiles may be stored on the user device. Alternatively or additionally, the user profiles may be stored on an external computing system. In these and other embodiments, the first device data may be provided to the external computing system for comparison. Alternatively or additionally, the user profiles or portions of the user profiles, such as the data to be compared, may be provided to the user device from the external computing system.

In some embodiments, the user device may perform the comparison of the first device data with the contacts in the contact lists by comparing an identification number of the first device data with an identification number of each of the contacts in each of the contact lists. For example, in some embodiments, the first device data may include a telephone number of the first device. In these and other embodiments, each contact in each of the contact lists may include a telephone number. The telephone numbers may be compared to determine whether the telephone numbers are the same.

Alternatively or additionally, in some embodiments, the first device data may include an identification username. In these and other embodiments, the identification username may be the name of an individual who owns the first device. The user device may compare the identification user name with a name of each of the contacts in each of the contact lists. The names may be compared to determine whether the names are the same.

In these and other embodiments, the user device may perform the comparison iteratively. The user device may iteratively select each user profile associated with the user device. The user device may iteratively select each contact list associated with each user profile. The user device may iteratively select each contact of each contact list. The user device may perform the comparison between the first device data and a contact during each iteration of the comparison process.

In block 308, it may be determined if the first device data matches one of the contacts in the contact lists. In response to the first device data matching one of the contacts ("Yes" at block 308), the process 300 may proceed to block 310. In response to the first device data not matching any of the contacts ("No" at block 308), the process 300 may proceed to block 312.

The user device may determine if the device data matches one of the contacts by employing differing degrees of certainty. In some embodiments, an identification number associated with the first device data may match a contact identification number if there is an exact match. For example, in some embodiments, if the first device data includes a telephone number and the contact includes a telephone number, the first device data may match the contact only if there is a 100% match between the telephone numbers. Alternatively or additionally, in some embodiments, the user device may determine if the device data matches one of the contacts if a certain fraction of the identification numbers match. For example, the first device data may include an identification number 123-456-7890. One of the contacts may include the identification number+1 123-456-7890. Although the telephone numbers may not match exactly, the user device may determine that the first device data and the contact match because the area code designation may match a default area code designation for the location of the user device.

Alternatively or additionally, the user device may determine that the first device data matches a contact based on an alternative spelling of a name or based on a phonetic spelling of a name. In these and other embodiments, the first device data may include an identification username and each contact may include an identification user name associated with the contact. For example, the first device data may include the name Marc and the contact may include the name Mark. Although the first device data may not match the contact on a letter-by-letter comparison of the names, the user device may determine that the names Marc and Mark are alternative spellings of one phonetic name.

Alternatively or additionally, the user device may determine that the first device data matches a contact if a certain percentage of the data matches. For example, in some embodiments, an identification number associated with first device data may not match the identification number associated with a contact but the identification username associated with the first device data may match the identification username associated with the contact. In these and other embodiments, the user device may determine that the first device data matches the contact. Alternatively or additionally, the user device may designate a degree of certainty with regards to a match.

In block 310, a user profile of the multiple user profiles that includes the contact in the one of the contact lists that matches the first device data may be selected. The process 300 may proceed to block 320.

In block 312, the first device data may be compared with entries in communication histories of each of the multiple user profiles. In block 314, it may be determined if the first device data matches one of the entries in the communication histories. In response to the first device data matching one of the entries ("Yes" at block 314), the process 300 may proceed to block 316. In response to the first device data not matching any of the entries ("No" at block 314), the process 300 may proceed to block 318.

In block 316, a user profile of the multiple user profiles that includes the entry in the one of the communication histories that matches the first device data may be selected. The process 300 may proceed to block 320. In block 318, a default user profile of the user device may be selected. The process 300 may proceed to block 320.

In block 320, an audio profile for the selected user profile may be loaded on the user device. In some embodiments, the audio profile for the selected user device may be loaded from a storage device on the user device. Alternatively or additionally, the audio profile may be downloaded from an external computing system onto the user device. The downloaded audio profile may be loaded onto the user device. Alternatively or additionally, the user device may check the user profile on the external computing system for updates to the audio profile on the user device. In response to determining that updates are available for the audio profile on the user device, the user device may download an updated audio profile to the user device. The updated audio profile may be loaded onto the user device.

In block 322, a communication session with the first device may be established. In block 324, a voice profile of a current user speaking on the user device and a voice profile of the selected user profile may be compared during the communication session. In block 326, it may be determined if the voice profile of the current user matches the voice profile of the selected user profile. For example, in some embodiments, characteristics of the voice profile of the current user, such as a pitch of the voice and a speaking style of the voice, may be compared with similar characteristics of the voice profile of the selected user profile. In some embodiments, the user device may identify user profiles that include voice profiles that are the closest to the voice profile of the current user. The user device may then perform a more in depth comparison to determine which of the identified user profiles includes the voice profile that is a match for the voice profile of the current user. In response to the voice profile of the current user not matching the voice profile of the selected user profile ("No" at 326), the process 300 may proceed to block 328. In response to the voice profile of the current user matching the voice profile of the selected user profile ("Yes" at 326), the process 300 may proceed to block 330.

In block 328, a different user profile of the multiple user profiles may be selected. In some embodiments, the different user profile may include a voice profile that matches the voice profile of the current user of the user device. In some embodiments, none of the user profiles associated with the user device may include a voice profile that matches the voice profile of the current user of the user device. If none of the user profiles associated with the user device include a voice profile that matches the voice profile of the current user of the user device, a default user profile may be selected as the different user profile. In block 332, an audio profile for the different user profile may be loaded on the user device. In block 330, the selected user profile may be retained on the user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, blocks 312 and 314 may be performed prior to blocks 306 and 308. Alternatively or additionally, the process 300 may further include comparing the first device data with other data elements of multiple user profiles of the user device.

Figure 4A:
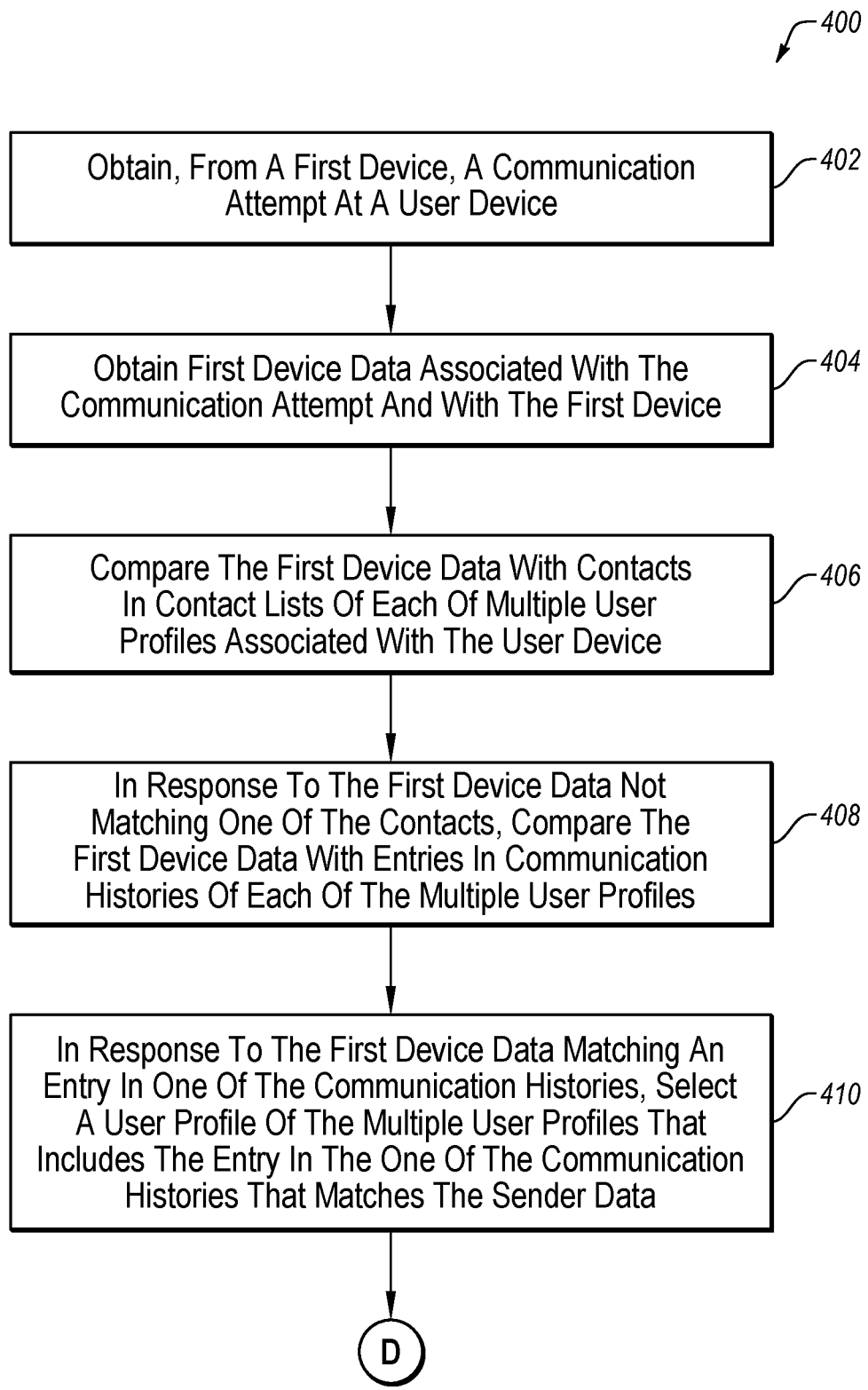
FIGS. 4a and 4b illustrate a flowchart of an example computer-implemented method to select user profiles.
Figure 4B:
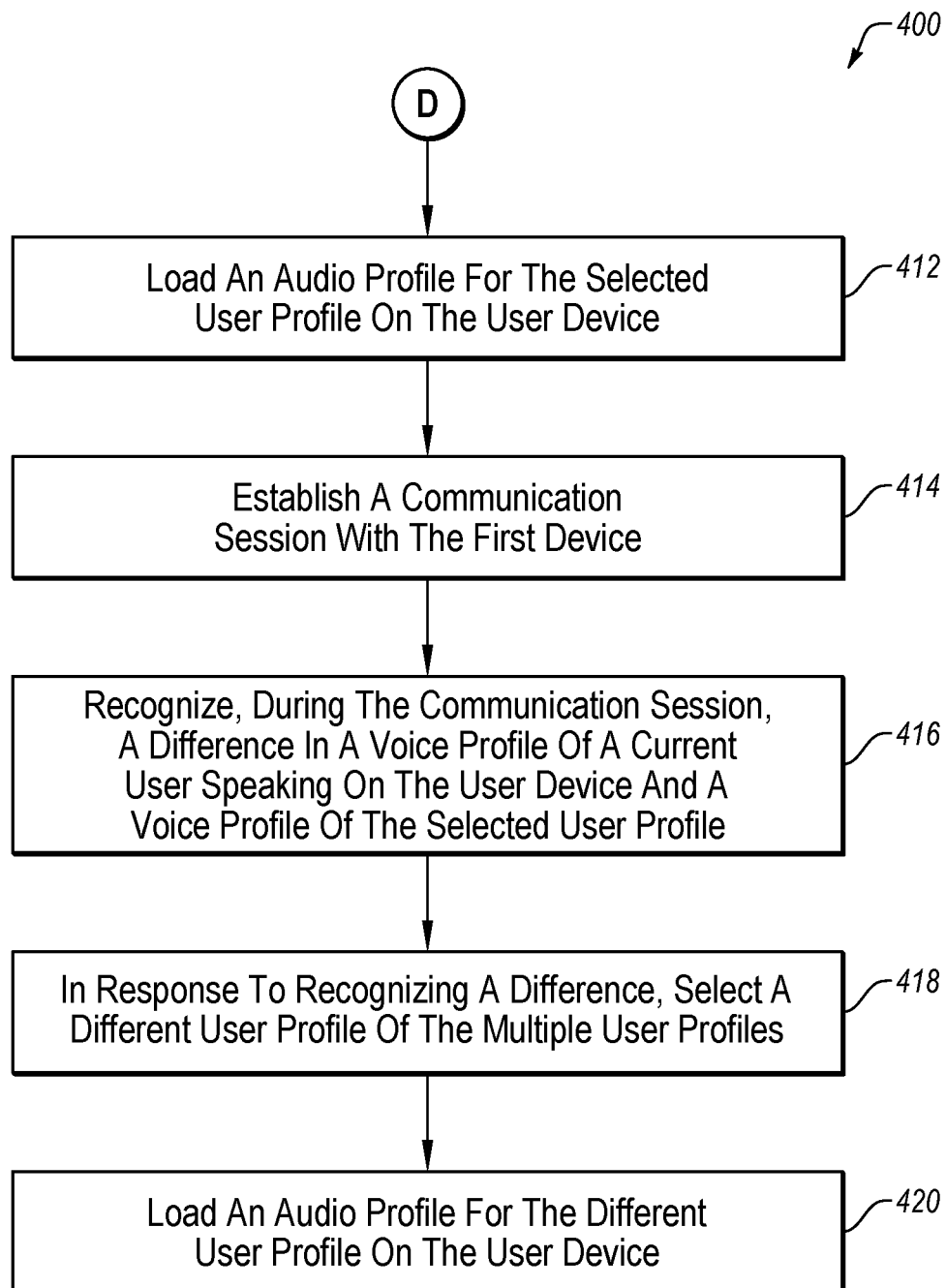

FIGS. 4a and 4b illustrate a flowchart of another example computer-implemented method to select user profiles. The method 400 may be arranged in accordance with at least one embodiment described in the present disclosure. The method 400 may be performed, in whole or in part, in some embodiments by a system and/or environment, such as the environment 100, the system 200, and/or the communication system 700 of FIGS. 1, 2, and 7, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a communication attempt may be obtained from a first device at a user device. In block 404, first device data associated with the communication attempt and with the first device may be obtained. In some embodiments, the first device data may be one or more of the following: an identification number, an identification username, and a communication time.

In block 406, the first device data may be compared with contacts in contact lists of each of multiple user profiles associated with the user device. In some embodiments, the user profiles may include one or more of the following: a contact list, a communication history, an audio profile, a voice profile, and user device settings.

In block 408, in response to the first device data not matching one of the contacts, the first device data may be compared with entries in communication histories of each of the multiple user profiles. In some embodiments, the communication histories may include one or more of the following: multiple identification numbers, multiple identification usernames, multiple communication durations, and multiple communication times.

In block 410, in response to the first device data matching an entry in one of the communication histories, a user profile of the multiple user profiles that includes the entry in the one of the communication histories that matches the first device data may be selected. In some embodiments, the user profile of the multiple user profiles that includes the entry in the one of the communication histories that matches the first device data may be selected in place of a default user profile being selected when the first device data does not match any entries in the communication histories.

In block 412, an audio profile for the selected user profile may be loaded on the user device. In block 414, a communication session may be established with the first device. In some embodiments, the communication session may include an audio communication. In some embodiments, the communication session may include a video communication.

In block 416, a difference in a voice profile of a current user speaking on the user device and a voice profile of the selected user profile may be recognized during the communication session.

In block 418, in response to recognizing a difference, a different user profile of the multiple user profiles may be selected. In block 420, an audio profile for the different user profile may be loaded on the user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may further include loading settings for the user device from the selected user profile on the user device and loading settings for the user device from the different user profile on the user device. Alternatively or additionally, the method 400 may include employing echo cancellation for a period of time in response to loading the audio profile for the different user profile on the user device.

Figure 5:
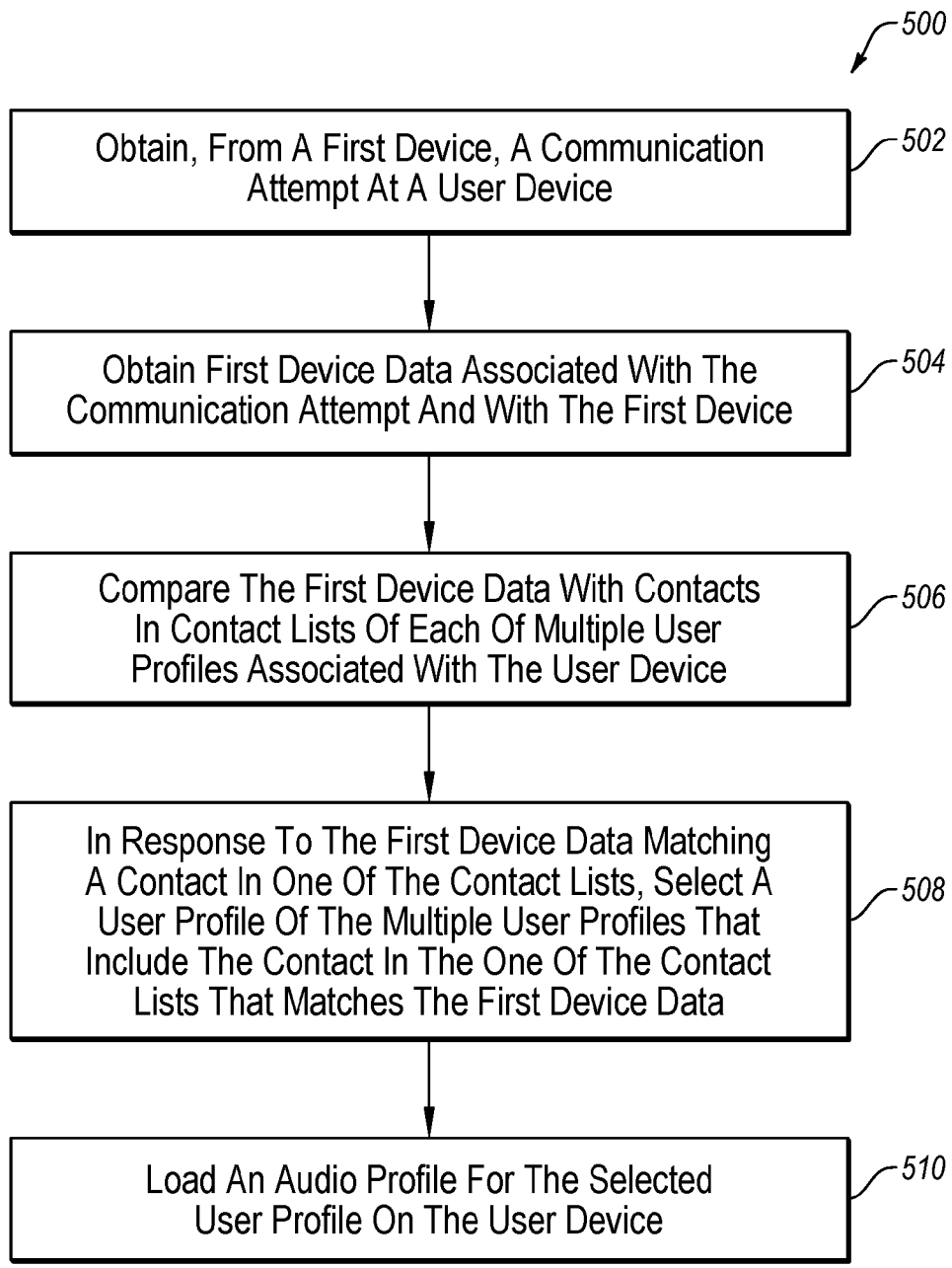
FIG. 5 is a flowchart of another example computer-implemented method to select user profiles.

FIG. 5 is a flowchart of an example computer-implemented method to provide transcriptions of a multimedia message. The method 500 may be arranged in accordance with at least one embodiment described in the present disclosure. The method 500 may be performed, in whole or in part, in some embodiments by a system and/or environment, such as the environment 100, the system 200, and/or the communication system 700 of FIGS. 1, 2, and 7, respectively. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a communication attempt may be obtained from a first device at a user device. In some embodiments, the communication attempt may include an audio communication, a video communication, or a multimedia message.

In block 504, first device data associated with the communication attempt and with the first device may be obtained.

In block 506, the first device data may be compared with contacts in contact lists of each of multiple user profiles associated with the user device. In some embodiments, the multiple user profiles may be stored on the user device or on an external computing system.

In block 508, in response to the first device data matching a contact in one of the contact lists, a user profile of the multiple user profiles that includes the contact in the one of the contact lists that matches the first device data may be selected. In some embodiments, the selected user profile may be selected in place of a default user profile being selected when the first device data does not match any contacts in the contact lists.

In block 510, an audio profile for the selected user profile may be loaded on the user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 500 may further presenting a list of the multiple user profiles that include the contact in the one of the contact lists that matches the first device data, obtaining input from a user, and selecting a user profile from the list of the multiple user profiles based on the input from the user.

Additionally or alternatively, the method 500 may further include establishing a communication session with the first device, recognizing during the communication a difference in a voice profile of a current user speaking on the user device and a voice profile of the selected user profile, selecting a different user profile of the multiple user profiles in response to recognizing a difference, loading an audio profile for the different user profile on the user device, and employing echo cancellation for a period of time.

Figure 6:
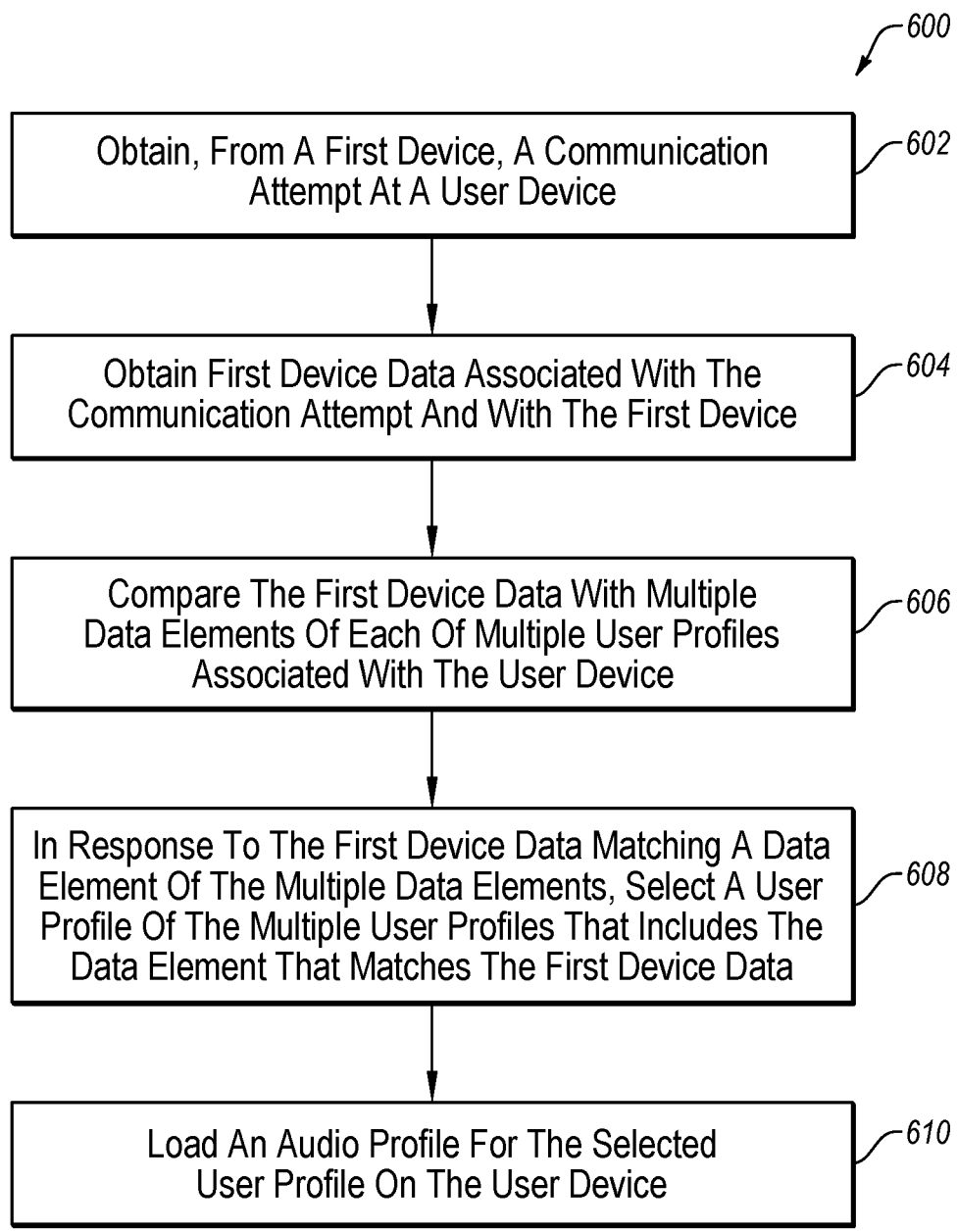
FIG. 6 is a flowchart of another example computer-implemented method to select user profiles.

FIG. 6 is a flowchart of another example computer-implemented method to provide transcriptions of a multimedia message. The method 600 may be arranged in accordance with at least one embodiment described in the present disclosure. The method 600 may be performed, in whole or in part, in some embodiments by a system and/or environment, such as the environment 100, the system 200, and/or the communication system 700 of FIGS. 1, 2, and 7, respectively. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a communication attempt may be obtained from a first device at a user device. In some embodiments, the communication attempt may include a video communication, an audio communication, or a multimedia message.

In block 604, first device data associated with the communication attempt and with the first device may be obtained.

In block 606, the first device data may be compared with multiple data elements of each of multiple user profiles associated with the user device. In some embodiments, the data elements may include a contact or an entry in a communication history.

In block 608, in response to the first device data matching a data element of the multiple data elements, a user profile of the multiple user profiles that includes the data element that matches the first device data may be selected.

In block 610, an audio profile for the selected user profile may be loaded on the user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 600 may further include establishing a communication session with the first device, recognizing during the communication a difference in a voice profile of a current user speaking on the user device and a voice profile of the selected user profile, selecting a different user profile of the multiple user profiles in response to recognizing a difference, and loading an audio profile for the different user profile on the user device.

Figure 7:
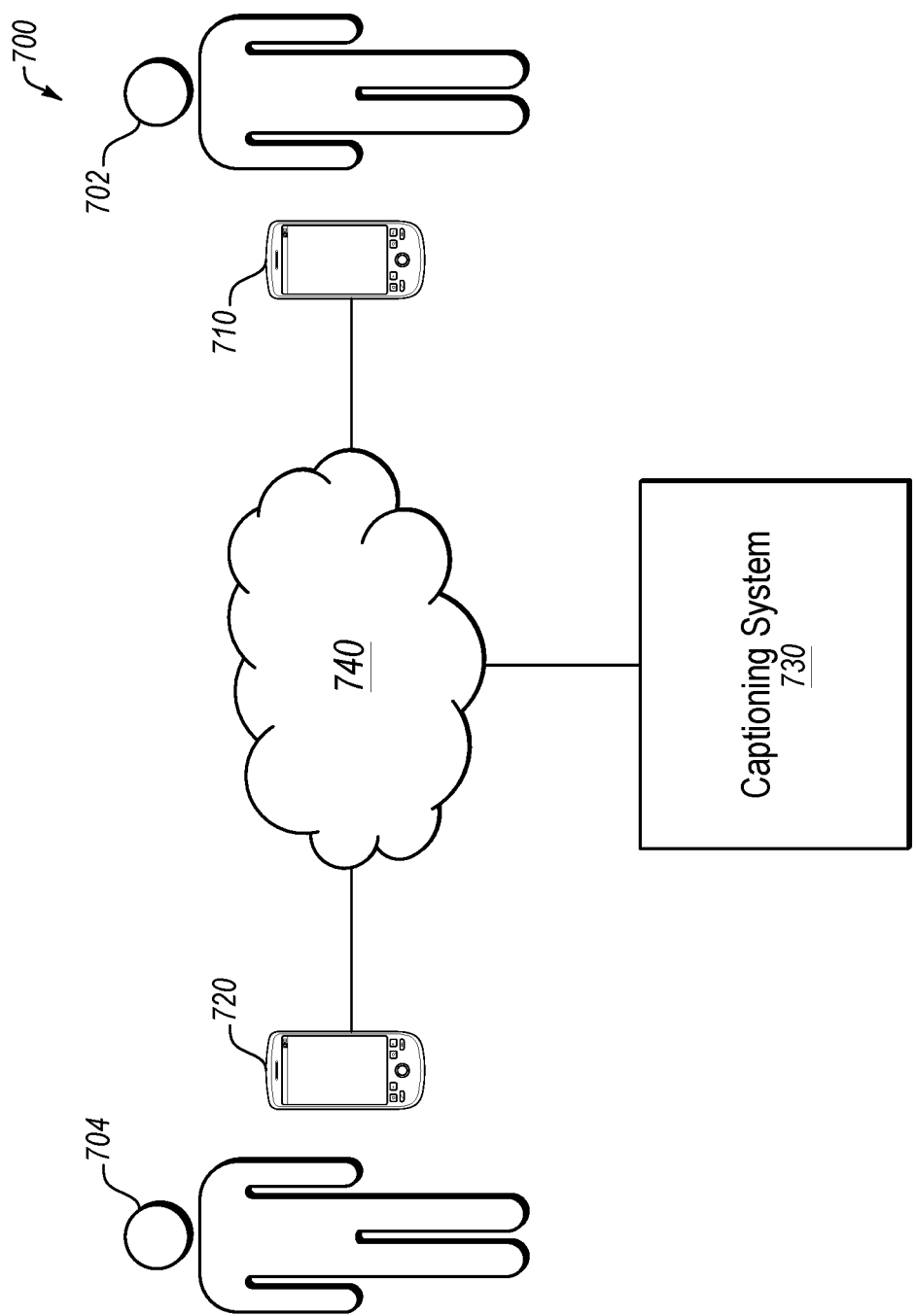
FIG. 7 illustrates an example communication system that may select user profiles.

FIG. 7 illustrates an example communication system 700 that may select and load a user profile on a user device. The communication system 700 may include or be arranged in accordance with at least one embodiment described in the present disclosure. The communication system 700 may include a first device 710, a second device 720, and a captioning system 730. The first device 710 and the captioning system 730 may be communicatively coupled by a network 740. Alternately or additionally, the first device 710 and the second device 720 may be communicatively coupled by the network 740. In some embodiments, the network 740 may be any network or configuration of networks configured to send and receive communications between systems and devices. In some embodiments, the network 740 may include a conventional type network, a wired or wireless network, and may have numerous different configurations. In some embodiments, the network 740 may also be coupled to or may include portions of a telecommunications network, including telephone lines, for sending data in a variety of different communication protocols, such as a plain old telephone system (POTS). In some embodiments, the network 740 may be similar to the network 104 of FIG. 1.

In some embodiments, the communication system 700 illustrated may be configured to facilitate an assisted call between a hearing-impaired user 702 and a second user 704. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

Alternatively or additionally, the communication system 700 illustrated may be configured to facilitate a call between a person with medical expertise and/or experience and the second user 704. As used in the present disclosure, a "person with medical expertise and/or experience" may be a nurse, doctor, or some other trained medical professional.

In some embodiments, a communication session, such as an audio or a video communication session, may be established between the first device 710 and the second device 720. In one example embodiment, the communication session may be a captioning communication session.

In some embodiments, the captioning system 730 may be an assistive service, which is intended to permit a hearing-impaired person to utilize a communication network and assist their understanding of a conversation by providing text captions to supplement voice conversation occurring during communication sessions with other devices, such as the second device 720. Alternatively or additionally, the captioning system 730 may be an assistive service to couple a person with medical expertise and/or experience with a person requesting medical assistance.

During a communication session, the captioning system 730 and the first device 710 may be communicatively coupled using networking protocols. In some embodiments, during the communication session between the first device 710 and the second device 720, the first device 710 may provide the audio signal from the second device 720 to the captioning system 730.

In some embodiments, the captioning system 730 may transcribe the audio signal and provide the transcription to the first device 710 or other devices. The transcription may provide information about the communication session between the first device 710 and the second device 720.

In some embodiments, the captioning system 730 may transcribe the audio signal in real-time and provide a transcription of the audio signal to the first device 710 in real-time. For example, in some embodiments, at the captioning system 730, a call assistant may listen to the audio signal of the second user 704 and "revoice" the words of the second user 704 to a speech recognition computer program tuned to the voice of the call assistant. In these and other embodiments, the call assistant may be an operator who serves as a human intermediary between the hearing-impaired user 702 and the second user 704. In some embodiments, text captions may be generated by the speech recognition computer as a transcription of the audio signal of the second user 704. The text captions may be provided to the first device 710 being used by the hearing-impaired user 702 over the network 740. The first device 710 may display the text captions while the hearing-impaired user 702 carries on a normal conversation with the second user 704. The text captions may allow the hearing-impaired user 702 to supplement the voice signal received from the second device 720 and confirm his or her understanding of the words spoken by the second user 704.

Modifications, additions, or omissions may be made to the communication system 700 without departing from the scope of the present disclosure. For example, in some embodiments, the second user 704 may be hearing impaired. In these and other embodiments, the captioning system 730 may provide text captions to the second device 720 based on audio data transmitted by the first device 710. Alternately or additionally, the captioning system 730 may include additional functionality. For example, the captioning system 730 may edit the text captions or make other alterations to the text captions after presentation of the text captions on the first device 710.

In some embodiments, the environment 100 of FIG. 1 may be combined with the communication system 700. For example, the communication system 700 may facilitate live verbal captioning of a communication session and the selection of a user profile of the multiple user profiles associated with the first device 710. For example, in some embodiments, a communication attempt may be sent from the second device 720 to the first device 710. The captioning system 730 may be configured to select a user profile and load the user profile on the first device 710 in response to obtaining the communication attempt along with performing the operations described with respect to FIG. 7.

As indicated above, the embodiments described herein may include the use of a special purpose or general purpose computer (e.g., the processor 210 of FIG. 2) including various computer hardware or software modules, as discussed in greater detail below. Further, as indicated above, embodiments described herein may be implemented using computer-readable media (e.g., the memory 212 of FIG. 2) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to activate a profile on a user device, the method comprising:
   obtaining, from a first device, a communication attempt at a user device;
   obtaining first device data associated with the communication attempt and with the first device;
   comparing the first device data with contacts in contact lists of each of a plurality of user profiles associated with the user device;
   in response to the first device data not matching one of the contacts, comparing the first device data with entries in communication histories of each of the plurality of user profiles;
   in response to the first device data matching an entry in one of the communication histories, selecting a user profile of the plurality of user profiles that includes the entry in the one of the communication histories that matches the first device data;
   loading an audio profile for the selected user profile on the user device;
   establishing a communication session with the first device;
   recognizing, during the communication session, a difference in a voice profile of a current user speaking on the user device and a voice profile of the selected user profile;
   in response to recognizing a difference, selecting a different user profile of the plurality of user profiles; and
   loading an audio profile for the different user profile on the user device.

2. The method of claim 1, wherein the communication session includes an audio communication or a video communication.

3. The method of claim 2, wherein the first device data includes one or more of the following: an identification number, an identification username, and a communication time; and the communication histories include one or more of the following: a plurality of identification numbers, a plurality of identification usernames, a plurality of communication durations, and a plurality of communication times.

4. The method of claim 1, wherein the user profile comprises one or more of the following: a contact list, a communication history, an audio profile, a voice profile, and user device settings.

5. The method of claim 1, further comprising:
   loading settings for the user device from the selected user profile on the user device; and
   loading settings for the user device from the different user profile on the user device.

6. The method of claim 1, wherein the user profile of the plurality of user profiles that includes the entry in the one of the communication histories that matches the first device data is selected in place of a default user profile being selected when the first device data does not match any entries in the communication histories.

7. The method of claim 1, further comprising employing echo cancellation for a period of time in response to loading the audio profile for the different user profile on the user device.

8. At least one non-transitory computer readable media configured to store one or more instructions that when executed by at least one computing system cause or direct the computing system to perform the method of claim 1.

9. A computer-implemented method to activate a profile on a user device, the method comprising:
   obtaining, from a first device, a communication attempt at a user device;
   obtaining first device data associated with the communication attempt and with the first device;
   comparing the first device data with a plurality of data elements of each of a plurality of user profiles of users associated with the user device, the users associated with the user device directly interacting with the user device during a communication session with the first device;

in response to the first device data matching a data element of the plurality of data elements, selecting a user profile of the plurality of user profiles that includes the data element that matches the first device data; and loading an audio profile for the selected user profile on the user device, the audio profile configured to adjust a frequency response of audio output by the user device according to a hearing impairment experienced by a user associated with the selected user profile.

10. The method of claim 9, wherein the communication attempt includes an audio communication, a video communication, or a multimedia message.

11. The method of claim 9, wherein the plurality of user profiles are stored on the user device or an external computing system.

12. The method of claim 9, wherein the selected user profile is selected in place of a default user profile being selected when the first device data does not match any of the plurality of data elements.

13. The method of claim 9, wherein the selecting a user profile comprises:
presenting a list of the plurality of user profiles that include the data element that matches the first device data;
obtaining input from a user; and
selecting a user profile from the list of the plurality of user profiles based on the input from the user.

14. The method of claim 9, further comprising:
establishing the communication session with the first device;
recognizing, during the communication session, a difference in a voice profile of a current user speaking on the user device and a voice profile of the selected user profile;
in response to recognizing a difference, selecting a different user profile of the plurality of user profiles; and
loading an audio profile for the different user profile on the user device.

15. At least one non-transitory computer readable media configured to store one or more instructions that when executed by at least one computing system cause or direct the computing system to perform the method of claim 9.

16. A computer-implemented method to activate a profile on a user device, the method comprising:
obtaining, from a first device, a communication attempt at a user device;
establishing a communication session with the first device;
selecting a user profile of a plurality of user profiles associated with the user device;
loading an audio profile for the selected user profile on the user device;
recognizing, during the communication session and after loading the audio profile for the selected user profile, a difference in a voice profile of a current user speaking on the user device and a voice profile of the selected user profile;
in response to recognizing a difference, selecting a different user profile of the plurality of user profiles; and
loading an audio profile for the different user profile on the user device.

17. The method of claim 16, wherein the communication attempt includes a video communication, an audio communication, or a multimedia message.

18. The method of claim 16, wherein the data elements comprise one or more of the following: a contact or an entry in a communication history.

19. The method of claim 16, further comprising:
obtaining first device data associated with the communication attempt and with the first device; and
comparing the first device data with a plurality of data elements of each of a plurality of user profiles associated with the user device,
wherein the user profile of the plurality of user profiles is selected that includes the data element that matches the first device data.

20. At least one non-transitory computer readable media configured to store one or more instructions that when executed by at least one computing system cause or direct the computing system to perform the method of claim 16.

* * * * *